(12) United States Patent
Chuang

(10) Patent No.: US 9,078,156 B2
(45) Date of Patent: Jul. 7, 2015

(54) METHOD OF CONTROLLING MINIMIZATION OF DRIVE TESTS

(71) Applicant: ACER INCORPORATED, New Taipei (TW)

(72) Inventor: Ming-Dao Chuang, New Taipei (TW)

(73) Assignee: ACER INCORPORATED, Xizhi Dist., New Taipei (TW)

( * ) Notice: Subject to any disclaimer, the term of this patent is extended or adjusted under 35 U.S.C. 154(b) by 80 days.

(21) Appl. No.: 13/685,669

(22) Filed: Nov. 26, 2012

(65) Prior Publication Data

US 2013/0203357 A1 Aug. 8, 2013

Related U.S. Application Data

(60) Provisional application No. 61/595,157, filed on Feb. 6, 2012.

(30) Foreign Application Priority Data

Mar. 15, 2012 (TW) .............................. 101108836 A

(51) Int. Cl.
H04B 17/00 (2006.01)
H04W 24/04 (2009.01)
H04W 24/10 (2009.01)

(52) U.S. Cl.
CPC ............... *H04W 24/04* (2013.01); *H04W 24/10* (2013.01)

(58) Field of Classification Search
CPC ............................... H04W 24/08; H04L 43/50

USPC ....................................................... 455/67.11
See application file for complete search history.

(56) References Cited

U.S. PATENT DOCUMENTS

| 8,553,563 B2 * | 10/2013 | Suzuki et al. ................. 370/241 |
| 2008/0182594 A1 | 7/2008 | Flore |
| 2011/0250893 A1 | 10/2011 | Lee |
| 2012/0044822 A1 | 2/2012 | Kim |
| 2012/0108199 A1 | 5/2012 | Wang |
| 2014/0016566 A1 | 1/2014 | Wu |

FOREIGN PATENT DOCUMENTS

| CN | 102291756 A | 12/2011 |
| TW | 201204079 | 1/2012 |
| WO | 2011137108 A1 | 11/2011 |

OTHER PUBLICATIONS

Samsung, "Procedure for logged MDT in idle", 3GPP TSG RAN WG2 #69bis R2-102292 (Apr. 16, 2010), p. 1-3.
Samsung, "Idle mode MDT measurements, flows", 3GPP TSG-RAN2#70 bis meeting R2-103790 (Jul. 2, 2010).
Ericsson, Alcatel-Lucent, Nokia Siemens Networks, ZTE, pCR to shadow TS 32.422 for MDT, "Use of paging for configuring logged MDT", 3GPP TSG-SA5 Meeting SA5#74 S5-103261(Nov. 19, 2010).

* cited by examiner

*Primary Examiner* — Eugene Yun
(74) *Attorney, Agent, or Firm* — Winston Hsu; Scott Margo

(57) ABSTRACT

A user equipment is configured to operate in an idle mode according to an MDT configuration. When receiving an activation signal from a base station, the user equipment is configured to execute one or multiple logged MDTs in the idle mode according to the activation signal and the MDT configuration.

5 Claims, 1 Drawing Sheet

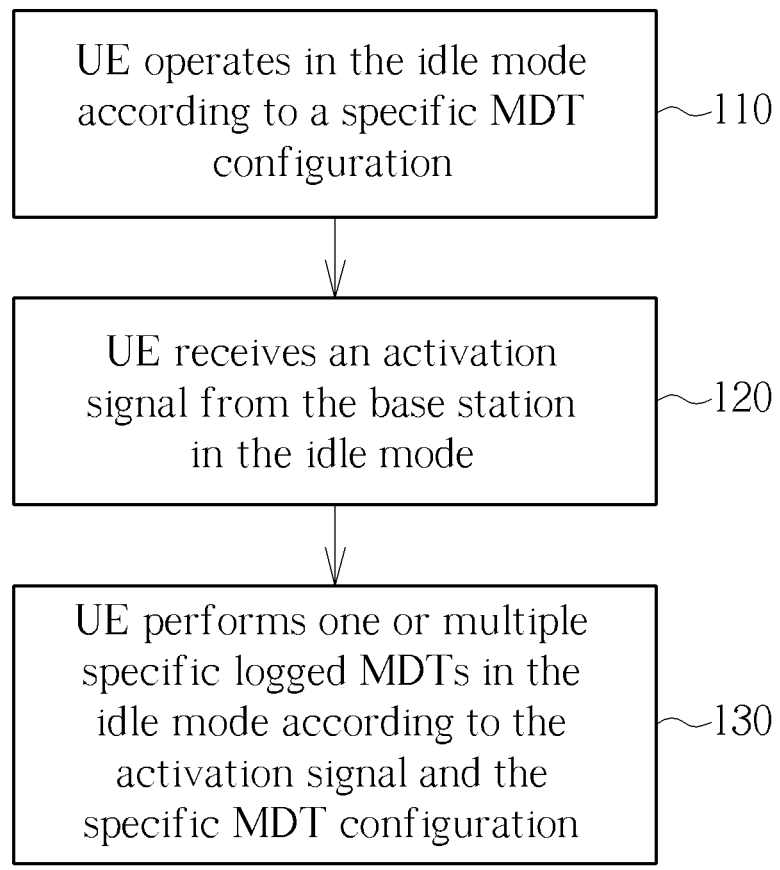

METHOD OF CONTROLLING MINIMIZATION OF DRIVE TESTS

CROSS REFERENCE TO RELATED APPLICATIONS

This application claims priority of U.S. Patent Application No. 61/595,157 filed on 2012 Feb. 6, which is included in its entirety herein by reference.

BACKGROUND OF THE INVENTION

1. Field of the Invention

The present invention is related to a method of controlling minimization of drive test, and more particularly, to a method of activating minimization of drive test in the idle mode.

2. Description of the Prior Art

The 3rd Generation Partnership Project (3GPP) has developed a universal mobile telecommunications system (UMTS) which adopts a wideband code division multiple access (WCDMA) technology capable of providing high frequency spectrum utilization, universal coverage, and high-speed/quality multimedia data transmission. In the UMTS, a radio access network known as a universal terrestrial radio access network (UTRAN) includes multiple base stations, commonly known as Node-Bs (NBs), for communicating with multiple user equipments (UEs). Furthermore, a long-term evolution (LTE) system is now being developed by the 3GPP in order to further improve performance of the UMTS to satisfy users' increasing needs. The LTE system includes a new radio interface and radio network architecture which provides a high data rate, low latency, packet optimization, and improved system capacity and coverage. In the LTE system, a radio access network known as an evolved UTRAN (E-UTRAN) includes multiple evolved NBs (eNBs) for communicating with multiple UEs and a core network which includes a mobility management entity (MME), a serving gateway and other devices for NAS (Non Access Stratum) control.

NBs of the wireless communication system must be deployed properly in order to provide seamless, high quality and large signal coverage without experiencing call drops or signal degradation. However, planning and optimizing the deployment of the NBs are based on signal quality measurements which may be time- and effort-consuming for an operator of the wireless communication system. Common methods of performing the measurements include measuring the signal strength or quality at different time and geographical locations of interest. Therefore, it is more economical for a UE of the wireless communication to perform the measurements and send the measurement report to a NB. Based on the measurement reports received from multiple UEs, the deployment of the NBs may be planned and optimized accordingly without spending many human and material resources. For such measurements, minimization of drive tests (MDTs) which include immediate MDT and logged MDT are defined in corresponding 3GPP specifications.

A UE is configured to perform an immediate MDT in a connected mode, in which reference signal received power (RSRP), reference signal received quality (RSRQ), power headroom (PH), uplink signal strength, or signal to interference and noise ratio (SINR) may be measured. The UE may report the measurement results to a NB serving the UE when a report condition is satisfied.

In order to perform a logged MDT, a UE is configured to receive a logged measurement configuration message from the NB in the connected mode. The logged measurement configuration message is associated with an MDT configuration which includes measurement duration, measurement interval or measurement parameter. After entering an idle mode, the UE is configured to perform a logged MDT according to the logged measurement configuration message and store the measurement result. When the measurement length or the amount of the measurement data exceed a predetermined value, the UE stops performing the logged MDT and sends the measurement result to the NB after switching to the connected mode.

In the prior art when the network requests to activate a specific logged MDT, which is currently not performed by the UE, for some reason, the UE needs to switch to the connected mode for receiving the corresponding instruction from the network. In other words, the NB is unable to directly control the operation of the UE in the idle mode. The UE is constantly required to switch between the connected mode and the idled mode, which may consume more power and waste network resources.

SUMMARY OF THE INVENTION

The present invention provides a method of controlling minimization of drive test. The method includes a user equipment operating in an idle mode according to an MDT configuration; and the user equipment performing one or multiple specific logged MDTs in the idle mode according to the MDT configuration and an activation signal received from a base station.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The FIGURE is a flowchart illustrating a method of activating logged MDT in the idle mode according to an embodiment of the present invention.

DETAILED DESCRIPTION

For a UE and a base station in a wireless communication system, the present invention provides a method of controlling a logged MDT in the idle mode. The UE may directly activate logged MDT in the idle mode according to messages received from the base station without switching to the connected mode. In the present invention, the wireless communication system may be a UMTS or an LTE system which includes a network and multiple UEs in a simplified embodiment. In the UMTS, the network may be a UTRAN including a plurality of NBs. In the LTE system, the network may be an E-UTRAN including a plurality of eNBs. The UE may be a mobile phone, a laptop computer, a tablet computer, an e-book or any portable computer system. However, the above examples are merely embodiments and do not limit the scope of the present invention.

The FIGURE is a flowchart illustrating a method of activating logged MDT in the idle mode according to an embodiment of the present invention. The flowchart in the FIGURE includes the following steps:

Step 110: UE operates in the idle mode according to a specific MDT configuration.

Step 120: UE receives an activation signal from the base station in the idle mode.

Step 130: UE performs one or multiple specific logged MDTs in the idle mode according to the activation signal and the specific MDT configuration.

When the UE is the connected mode before executing step 110, the base station may send a logged measurement configuration message which is associated with the specific MDT configuration. In step 110, the UE may operate in the idle mode according to the logged measurement configuration message, such as performing one or multiple logged MDTs.

In step 120, the base station may send the activation signal to the UE if the network has requested the UE to switch on one or multiple specific logged MDTs for some reason, such as for collecting more information from a base station, for collecting information from a specific base station, or for collecting information from a base station when encountering interference.

According to corresponding 3GPP specifications (such as Rel-10 TS 37.320), the base station may send a paging message via a paging control channel (PCCH) to the UE when operating in the idle mode. The paging message may include information such as CN domain indicator, UE identification, paging range and paging cause. In the embodiment of the present invention, the activation signal may be an over-the-air (OTA) paging message with a paging cause "activate logged MDT" which may indicate the activation of one or multiple specific logged MDTs.

According to corresponding 3GPP specifications (such as Rel-10 TS 37.320), the base station may send a logged measurement configuration message to the UE when operating in the connected mode. The logged measurement configuration message may include MDT configuration such as measurement duration, measurement interval or measurement parameter. In the embodiment of the present invention, the activation signal may be an OTA logged measurement configuration message with specific parameters set to be associated with the activation of one or multiple specific logged MDTs.

When receiving the activation signal, the UE may have completed all logged MDTs. Or, the UE may have completed some logged MDTs, but is performing another or other logged MDTs. In step 130, the UE is configured to perform one or multiple specific logged MDTs in the idle mode according to the activation signal and the specific MDT configuration In the present invention when the UE operating in the idle mode receives the activation signal from the base station, the UE may directly perform one or multiple specific logged MDTs in the idle mode according to the current MDT configuration. Since the UE may directly activate one or multiple specific logged MDTs in the idle mode without switching to the connected mode, the present invention is advantageous in lowering power consumption and economizing network resources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling minimization of drive test (MDT), comprising:
   a user equipment receiving an MDT configuration associated with one or multiple logged MDTs from a base station in a connected mode;
   the user equipment performing the one or multiple logged MDTs according to the MDT configuration after switching from the connected mode to an idle mode;
   the base station requesting the user equipment to activate in the idle mode one or multiple specific logged MDTs which are not to be performed according to the MDT configuration by sending an activation signal; and
   the user equipment performing the one or multiple specific logged MDTs in the idle mode according to the MDT configuration received from the base station in the connected mode and the activation signal received from the base station in the idle mode.

2. The method of claim 1, wherein the user equipment is performing the one or multiple logged MDTs or has completed performing the one or multiple logged MDTs when receiving the activation signal.

3. The method of claim 1, wherein the user equipment is not performing the one or multiple specific logged MDTs when receiving the activation signal.

4. The method of claim 1, wherein the activation signal is a paging message received from the base station via a paging control channel (PCCH) and a paging cause of the paging message is associated with activating the one or multiple specific logged MDTs.

5. The method of claim 1, wherein:
   the activation signal is an over-the-air (OTA) logged measurement configuration message transmitted in the idle mode; and
   the activation signal includes settings for activating the one or multiple specific logged MDTs.

* * * * *